United States Patent [19]

Masheris et al.

[11] Patent Number: 4,549,038
[45] Date of Patent: Oct. 22, 1985

[54] CORD GRIP

[75] Inventors: Fred Masheris, Elgin; Leonard H. Michaels, Warrenville; William J. Scott, Sycamore; Roy N. Voss, Fairdale, all of Ill.

[73] Assignee: Ideal Industries, Inc., Sycamore, Ill.

[21] Appl. No.: 524,868

[22] Filed: Aug. 22, 1983

[51] Int. Cl.⁴ ............................................. H02G 3/22
[52] U.S. Cl. ................................. 174/65 SS; 285/343
[58] Field of Search ............... 174/65 SS, 65 R, 151; 285/158, 161, 342, 343, 354, 330; 339/103 R; 248/56

[56] References Cited

U.S. PATENT DOCUMENTS

| | | | |
|---|---|---|---|
| 2,564,302 | 8/1951 | Fraser | 174/65 |
| 2,651,529 | 7/1951 | Wayman | 285/6.5 |
| 3,040,120 | 6/1962 | Berry | 174/65 SS X |
| 3,058,762 | 10/1962 | Howe | 285/340 |
| 3,248,135 | 4/1966 | Meripol | 285/323 |
| 3,567,843 | 3/1971 | Collins et al. | 174/51 |
| 3,603,912 | 9/1971 | Kelly | 339/89 |
| 3,647,934 | 3/1972 | Hurtt | 174/65 |
| 3,667,783 | 6/1972 | Sotolongo | 285/161 |
| 3,913,956 | 10/1975 | Eidelberg et al. | 285/343 |
| 4,012,578 | 3/1977 | Moran et al. | 174/65 R X |
| 4,030,741 | 6/1977 | Fidrych | 285/161 |
| 4,116,472 | 9/1978 | Schmitt | 285/4 |
| 4,350,840 | 9/1982 | Michaels | 174/65 |

FOREIGN PATENT DOCUMENTS 2259667  6/1974  Fed. Rep. of Germany .... 174/65 R

*Primary Examiner*—A. T. Grimley
*Assistant Examiner*—D. A. Tone
*Attorney, Agent, or Firm*—Kinzer, Plyer, Dorn & McEachran

[57] ABSTRACT

This is concerned with a cord grip for use with various types of electrical cord and is more specifically concerned with a compression chamber with a distortable grommet which has gripper elements associated therewith so that the gripper elements or unit perform a closing action on the cord in response to reduction in the volume of the compression chamber.

9 Claims, 6 Drawing Figures

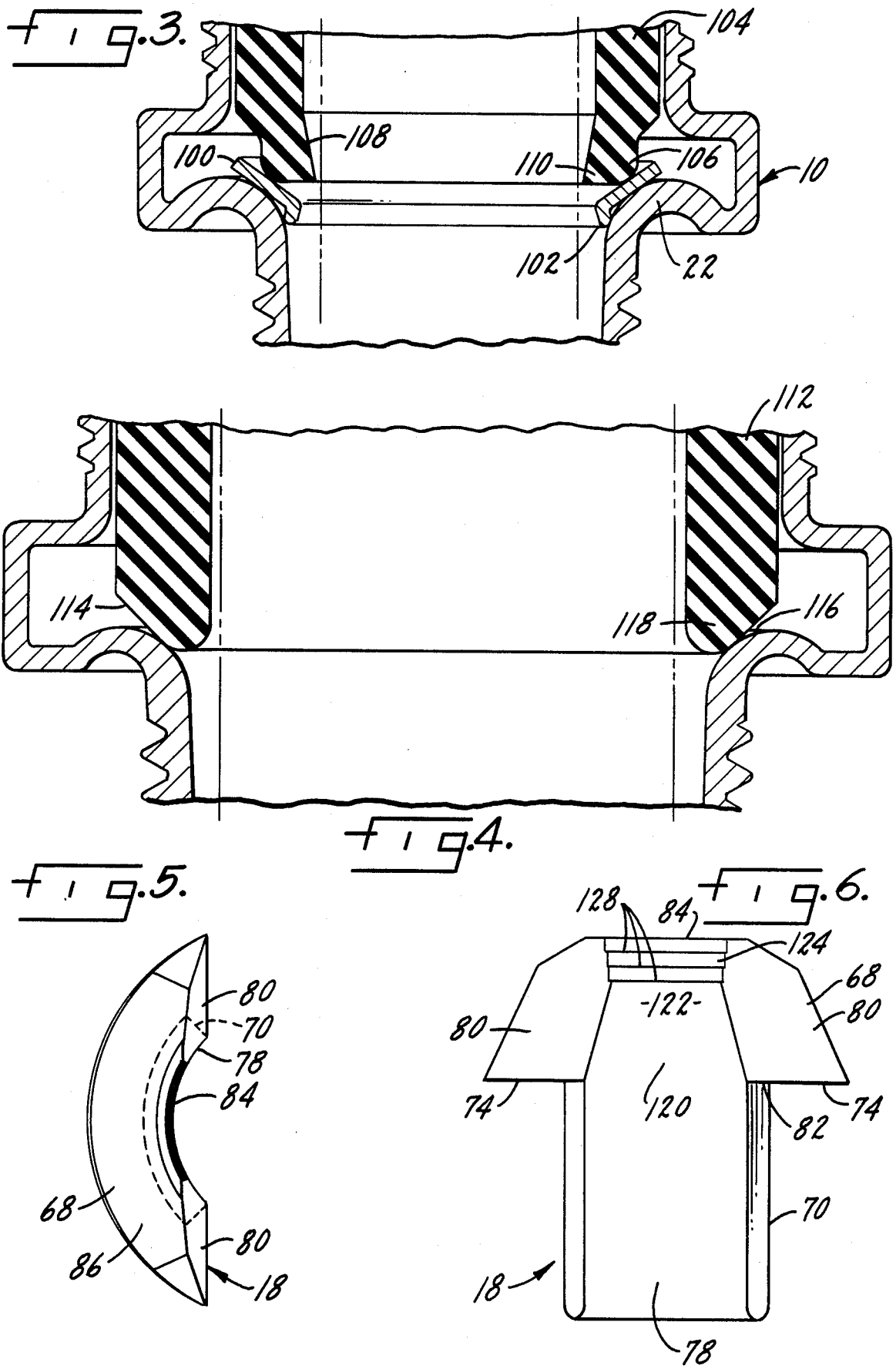

4,549,038

CORD GRIP

SUMMARY OF THE INVENTION

This invention is concerned with a cord grip or cord grip connector and is more specifically of the type for providing a liquid tight joint.

A primary object of the invention is a cord grip that has improved sealing capabilities or characteristics.

Another object is a cord grip of the above type with a minimum number of parts.

Another object is a cord grip of the above type which is easy to manufacture.

Another object is a cord grip which takes an improved or better "bite" on the cord.

Another object is a cord grip with a minimum number of parts.

Other objects will appear from time to time in the ensuing specification and drawings.

BRIEF DESCRIPTION OF THE DRAWINGS

FIG. 3 is similar to FIG. 2 of a further variant.
FIG. 4 is similar to FIGS. 2 and 3 of a further variant.
FIG. 5 is an end view of a gripper element.
FIG. 6 is a side view of FIG. 5.

BRIEF DESCRIPTION OF THE PREFERRED EMBODIMENT

Figure 1:
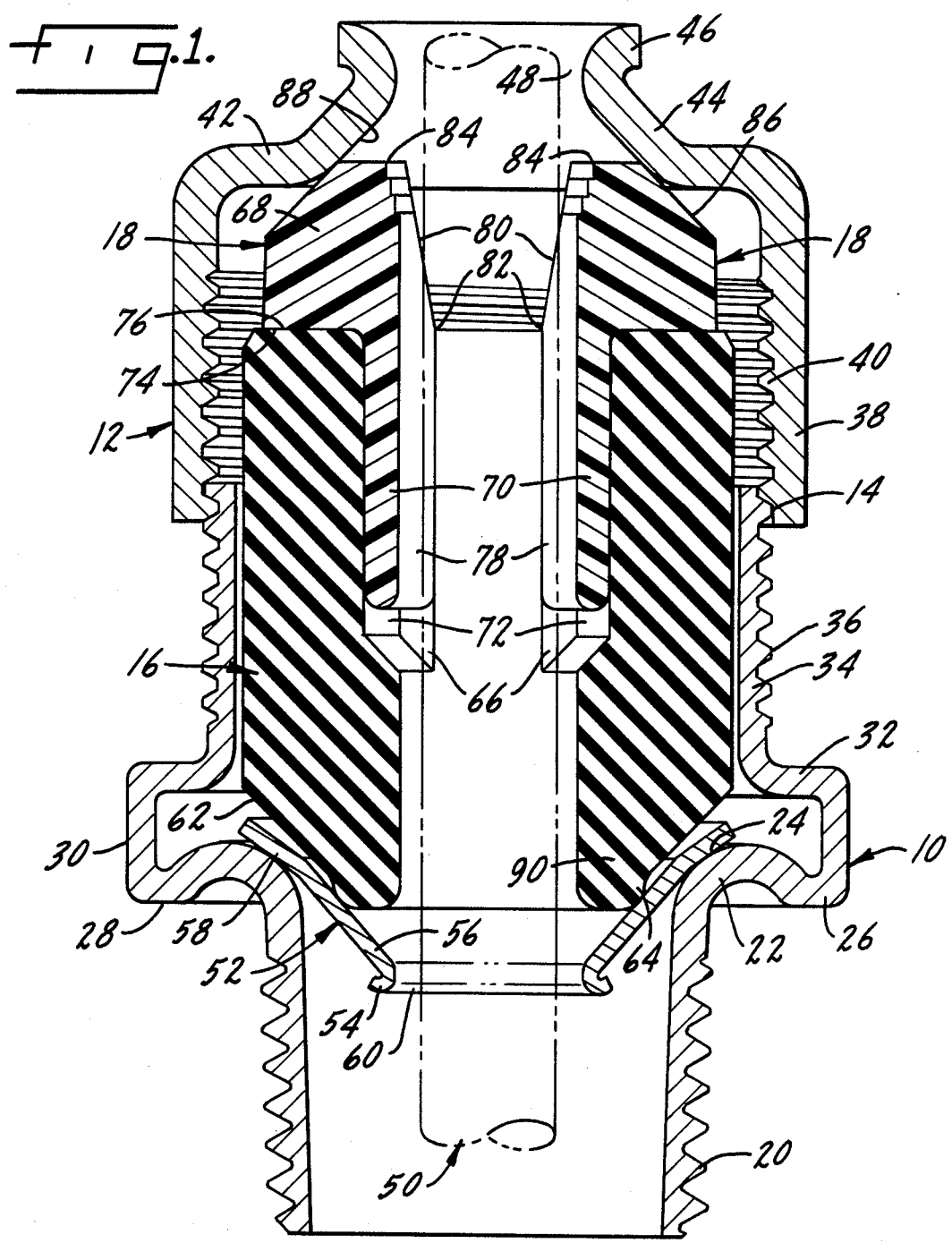
FIG. 1 is a side view in section of a cord grip.

In FIG. 1, the housing is defined by a shell element 10 and a cap or nut 12 which are screw threaded together at 14 to define a compression chamber for a grommet assembly which is made up of a grommet or gland 16 and gripper elements 18 which may be plastic or otherwise. The inner end of the shell 10 has a threaded portion 20 so that the entire assembly may be mounted on a box, panel, etc. which is conventional. The intermediate portion of the housing is deformed into an annular or curvilinear shoulder 22 which provides a toroidal convex inner abutment 24 flowing outwardly into an annulus 26, the outer surface of which provides an abutting flange 28. The outer surface or portion 30 may be formed into a polygonal shaped exterior with flats thereon to accept a wrench or any suitable tool. This is followed by an inwardly extending annulus 32 which merges into a cylindrical section 34 with threads 36 thereon.

The cap 12 has a corresponding cylindrical portion 38 which is threaded on the interior thereof as at 40, followed by a turned in section or annulus 42 which merges with a conical portion 44 which thereafter is turned outwardly at 46 in a reverse bend so as to provide a smooth entrance or passage 48 so that a cord, indicated generally at 50, may easily pass therethrough without damage, snagging or otherwise.

The grommet 16 may be considered as generally annular and may be made of rubber or a suitable rubber substitute or a suitable material having rubber-like characteristics as to distortability and compressability. The rear portion or bottom of the grommet seats against a washer or insert 52 which may be galvanized, plated or otherwise and which, in the particular form shown in FIG. 1, is somewhat conically shaped, narrowing to a central passage that is defined by a reversely bent lip or curl 54. The washer itself has an inner cone section 56 and an outer cone section 58 which have different cone angles with the inner cone section 56 having a somewhat lesser included angle than the outer cone section. As shown, it may be considered that the outer cone section 58 abuts the rounded abutment surface 24 in the shell or body element. The curl 54, like the opening 48 on the cap, provides a smooth, well-rounded passage 60 through which the cord may extend.

The rear surface 62 of the grommet is formed on a taper or cone and has an enlargement 64 on or adjacent the end thereof which, in effect, functions as an O-ring. As shown, the O-ring 64 is an integral part of the grommet 16 but in certain situations, the O-ring might be made as a separate unit in the nature of a standard O-ring which could be clamped on or affixed to or mounted on the rear end of the grommet or gland 16. The result is that the O-ring 64, be it integral or otherwise, contacts the washer angle 56 first and, thereafter, in response to axial loading extrudes downwardly and inwardly on a full circumferential or annular basis, toward and into the annular gap 60 around the cord itself. As shown in FIG. 1, the inner surface of the grommet has arcuate cavities or cutouts 66 which, as explained hereinafter, accept a part of the gripper elements.

The unit has two gripper elements 18 which are mounted diametrically opposite each other, on each side of the cord passage. Each of the gripper elements is defined by or includes a head element 68 which is on the forward portion thereof with a shank 70 extending rearwardly therefrom and accepted or positioned in the cavity 66 in the distortable grommet with a slight spacing 72 at the rear thereof. The head and shank of each of the gripper elements come together in an abutting surface 74 which is flush against the forward face 76 of the distortable grommet. Each of the grippers is provided with an inner arcuate surface 78 which is semicylindrical or arcuate and extends all the way through the head and shank. When the gripper elements are positioned in the grommet, as shown in FIG. 1, it will be noted that this inner arcuate or curvilinear surface of the gripper elements at least in part defines a part of the cord passage through the grommet.

The outer surfaces 80 of the forward inner portions of the gripper elements are inclined inwardly and terminate in an edge or pivot point 82. The leading edge 84 of the gripper elements, which is somewhat rounded, functions as a biting area to indent or compress the cord and is specially structured or arranged to do so as explained hereinafter. The outside forward surfaces of the gripper elements are inclined or are on a dihedral, as at 86, and oppose the inner inclined surface 88 of the conical portion 44 of the nut 12. The merging surfaces 74 of the head and shank of the gripper elements abut the forward face of the distortable grommet, at 76, in an area of annular extent. The rear portion or area of the grommet, as at 90 behind or beyond the shanks of the gripper elements, provides a solid annular compression annulus for engaging the outside of the cord jacket.

In use, after a cord has been positioned through the unit, the cap and the shell are screwed together which axially reduces the volume in the compression chamber provided between the forward inner surface 88 of the cap and the rear abutment which is afforded by the washer 52. The inclined forward faces 86 on the outside of the gripper elements engage the inside surface 88 of the cap. This thrusts the O-ring formation 64 against the lesser angle cone 56 of the washer. This tends to thrust the grippers rearwardly thereby applying pressure to the distortable grommet in the area 90. The grommet will thus be actually compressed which tends to force the O-ring area 64 into the annular opening 60 between the curl 54 and the cord. At the same time, the inclined or beveled face 86 on the front of the gripper elements tend to force the head elements of the grippers inwardly. This results in a pivoting action of each of the gripper elements about the rear of the shanks. Depending upon the size of the cord the gripper will pivot more or less, depending upon when its forward gripping area or nose 84 engages the outer surface or jacket of the cord. Thereafter, further shortening of the compression chamber causes the edge 84 to indent the cord jacket. At the same time the rear end of the shanks 70 of the gripper elements will tend to expand or be forced out thereby extending the surrouding portion of the grommet, both circumferentially and axially enhancing distortion of the rear annulus or area 90 of the grommet. The result is a squeezing down of the tapered rear area at 90 of the grommet into the annular space or opening between the cord and the curl 54 which, in certain situations, can cause the O-ring area 64 to extrude into the annular opening in full and completely seal around the cord.

The provision of the O-ring area 64 on the tapered rear surface 62 of the grommet has the advantage that the initial axial loading thereon will provide a full and effective 360° seal, although localized, between the grommet and conical washer. Thereafter further compressing will cause the tapered surface 62 of the grommet to fully merge into and abut against the conical inner surface of the washer. This will cause the O-ring area 64 to be additionally extruded or formed or guided into the annular opening 60 between the cord and the curl.

The double taper or two cone areas on the washer 52 has the advantage that the tapered rear area 90 of the grommet more fully sockets into the rear area of the housing, it being understood that, when assembled, the washer 52 functions as a part of the housing. Thus, the bottom of the grommet, as tapered, will fully seat in and socket down in the bottom of the housing without unduly extending the housing length which ensures accurate and complete assembly and, when the compression chamber is reduced by screwing the parts together, effects a tight seal around the cord at the curl opening.

Figure 2:
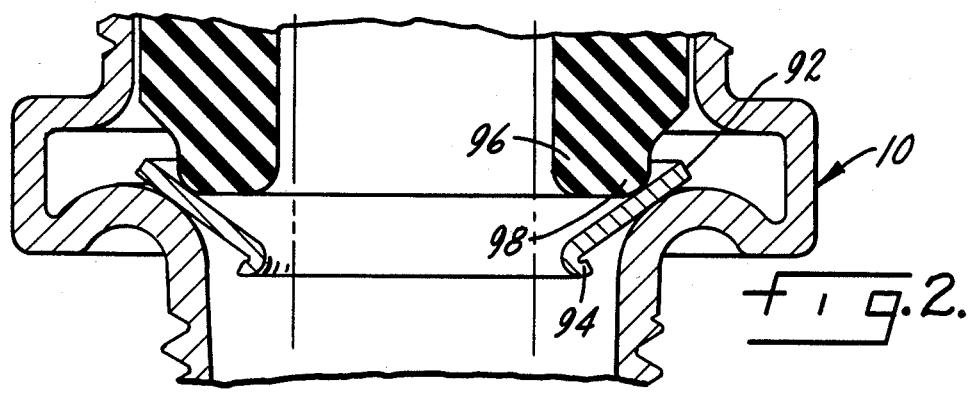
FIG. 2 is a part of FIG. 1 of a variant form.

A variant form has been shown in FIG. 2 in which the central passage through the grommet is larger so that the FIG. 2 form may be considered as designed or constructed for a range of cords which are individually larger than those in FIG. 1. The washer 92 may have about the same outside diameter as what is shown in FIG. 1 but has a larger opening through the center so that its inside diameter is greater. It also has the curl 94 at the opening but does not have the two cone area like the FIG. 1 washer, but, rather has just a one cone area. It will be noted that the bottom end 96 of the grommet is larger in inside diameter and the O-ring formation 98 is similar to what is used in the FIG. 1 form.

FIG. 2 has the advantage that the washer is provided with only a single cone area which has the advantage of simplicity and in the sizes involved is totally adequate in channeling and guiding the O-ring area 98 into the annular space between the cord and curl.

In the form shown in FIG. 3, the washer 100 has a reverse cone 102 of limited axial extent on the inner surface thereof and it may be considered a short cylindrical section. This is to say that a full outward bent curve as in FIGS. 1 and 2 is not necessary in the larger sizes and as a matter of fact in view of the fit with the outwardly curved section 22 of the body element, it has the advantage that more accurate socketing of the larger size washer is acquired. The grommet 104 also has the O-ring area 106 on the outer tapered surface and may function in the same manner as explained herein above. As well, the grommet has a tapered inner surface 108 which either alone or in combination with the O-ring formation 106 has the advantage that the rear portion 110 of the grommet when subjected to the compressive loading caused by reducing the volume of the compression chamber will more fully extrude into the annulus between the cord and section 102 on the washer. This is to say that the whole lower end 110 of the grommet due to the O-ring formation 106 and the internal taper 108 will be more positively and accurately be guided into the annular opening so as to fully grip and seal around the exterior of the cord as well as slightly extrude through the annular opening thereby providing a full and effective seal.

A variant form has been shown in FIG. 4 in which a separate cone or washer is not used in the rear or bottom of the compression chamber. Rather, the bottom end of the grommet 112 is tapered on its outer surface as at 114 and directly engages the rounded or curvilinear shoulder 116 on the body element. The grommet itself tapers to a rounded inner lower portion 118 which, when the parts are screwed together, is compressed into the annular space between the body element and the exterior of the cord so that a full seal is provided. It will be noted in FIG. 4 that the cord is quite large and very closely approaches the internal diameter of the body element.

A separate gripper element is shown in FIGS. 5 and 6 and some of the same numerals used in FIG. 1 have been used here. The head portion 68 is joined to the shank 70 with the somewhat conical passage 78 therethrough which narrows, as at 120 to a throat 122 which widens out thereafter in a series of steps 124 to the forward biting edge 84. Each of the steps 124 may be considered, as shown in FIG. 1, a separate cylindrical portion which may be described about the central axis of the grommet and housing with each of the cylindrical sections being somewhat larger in diameter leading toward the biting edge 84. Being steps they present no interference to the passage of the cord. Three such steps have been shown in the drawings but more or less might be used depending upon the particular application. The arrangement has the advantage that when the parts are screwed together and the gripper elements tend to pivot about the rear end of the shank 70, the steps 124 pivot so that each of the edges 128 are cocked at an angle and become individual biting areas so that instead of just one bite, as by the leading edge 84 in the particular arrangement shown, a plurality of bites, in this case four, will be taken on the exterior of the cord to ensure a thorough and complete grip.

This general type of cord grip is shown in prior U.S. Pat. No. 4,350,840, issued Sept. 21, 1982 and reference is made thereto for various other operative aspects of the broad subject matter. As shown in that prior patent, the gripper element can be disposed on various centers. And it should be understood that any one of those arrangements could be used here. As well, the rear shanks of the gripper elements are shown in one form in U.S. Pat. No. 4,350,840 as being socketed into the grommet, specifically FIG. 10 of that patent. And that arrangement can also be used in one or more of the present forms of cord grip.

Whereas the preferred form and several variations of the invention have been shown, suggested, described and alluded to, it will be understood that suitable additional modifications, changes, substitutions and alterations may be made without departing from the invention's fundamental theme.

We claim:

1. In a cord grip, interfitting parts defining a generally annular compression chamber with a cord receiving central passage therethrough, the parts being screw fitted together so that relative rotation of one relative to the other reduces the axial dimension and therefore the volume of the chamber, a gripper unit in the chamber constructed to perform a closing and gripping action on a cord in response to reduction in the volume of the chamber, a distortable generally annular grommet in the rear of the chamber in contact with and functioning to cause a compressive axial load to be applied by the gripper unit on a cord in response to reduction in the volume of the compression chamber, opposed bevel surfaces on one end of the grommet and compression chamber constructed and arranged to be pressed against each other in response to reduction in the volume of the compression chamber, and an O-ring formation on the beveled surface of the grommet arranged to take the initial load resulting from reduction in the compression chamber volume prior to contact between the remainder of the opposed beveled surfaces so that an area of concentrated seal effect is provided.

2. The structure of claim 1 further characterized in that the O-ring formation is an integral part of the grommet.

3. The structure of claim 1 further characterized in that the beveled surface on the rear of the compression chamber is defined by a conical washer insert.

4. The structure of claim 1 further characterized in that the gripper unit includes a plurality of independent gripper elements.

5. The structure of claim 1 further characterized in that the O-ring formation is on the small end of the grommet's beveled surface.

6. In a cord grip, interfitting parts defining a generally annular compression chamber with a cord receiving central passage therethrough, the parts being screw threaded together so that relative rotation of one relative to the other reduces the axial dimension and therefore the volume of the chamber, a gripper unit in the chamber constructed to perform a closing and gripping action on a cord in response to reduction in the volume of the chamber, a distortable generally annular grommet in the chamber operative with the gripper unit such that in response to reduction of the chamber volume, the gripper unit bites into and interlocks with a cord, opposed beveled surfaces on one end of the grommet and compression chamber arranged to be compressed against each other in response to reduction of the volume of the compression chamber, the beveled surface on the compression chamber merging into the cord receiving central passage, and an annular enlargement on and contiguous to the ends of the grommet's beveled surface constructed and arranged to at least partially extrude into and seal the annular clearance in the central passage between the cord and the compression chamber in response to substantial reduction in the volume of the compression chamber.

7. The structure of claim 6 further characterized in that the gripper unit is in the front of the compression chamber and the grommet is in the back, and further including an interfit between the gripper unit and the grommet such that they stay together, as a unit, when removed from the compression chamber.

8. The structure of claim 6 further characterized in that the gripper unit includes a plurality of independent gripper elements.

9. The structure of claim 6 further characterized in that the annular enlargement on the grommet is an integral part thereof.

* * * * *